(12) United States Patent
Baderspach et al.

(10) Patent No.: US 6,752,356 B2
(45) Date of Patent: Jun. 22, 2004

(54) CONTROL DEVICE AND METHOD FOR EMERGENCY OPENING OF AN AIRCRAFT EVACUATION DOOR

(75) Inventors: Jérôme Baderspach, Toulouse (FR); Albert Modern, Blalnac (FR); Sébastien Rondot, Toulouse (FR)

(73) Assignee: Airbus France, Toulouse Cedex (FR)

( * ) Notice: Subject to any disclaimer, the term of this patent is extended or adjusted under 35 U.S.C. 154(b) by 0 days.

(21) Appl. No.: 10/264,610

(22) Filed: Oct. 3, 2002

(65) Prior Publication Data

US 2003/0089827 A1 May 15, 2003

(30) Foreign Application Priority Data

Oct. 5, 2001 (FR) ............................................. 01 12838

(51) Int. Cl.⁷ ................................................. B64C 1/14
(52) U.S. Cl. .................................................. 244/129.5
(58) Field of Search ............................ 244/905, 137.2, 244/129.5, 137.4

(56) References Cited

U.S. PATENT DOCUMENTS

| | | | | |
|---|---|---|---|---|
| 2,954,971 A | * | 10/1960 | Simpson | |
| 3,633,853 A | * | 1/1972 | Collins | |
| 3,921,335 A | * | 11/1975 | Hewitt et al | |
| 4,106,729 A | * | 8/1978 | Bergman et al. | |
| 4,441,582 A | * | 4/1984 | Ward | |
| 4,715,562 A | * | 12/1987 | Bokalot | |
| 4,999,551 A | * | 3/1991 | Yoshida et al. | |
| 5,379,971 A | | 1/1995 | Kim et al. | ................ 244/129.5 |
| 5,606,826 A | * | 3/1997 | Calhoun | |
| 6,158,692 A | * | 12/2000 | Abild et al. | |
| 6,457,677 B2 | * | 10/2002 | Dazet et al. | |

FOREIGN PATENT DOCUMENTS

| | | | |
|---|---|---|---|
| EP | 0 512 588 A1 | 11/1992 | ............. B64C/1/14 |
| EP | 0 741 073 A1 | 2/1995 | ............. B64C/1/14 |

\* cited by examiner

*Primary Examiner*—Tien Dinh
(74) *Attorney, Agent, or Firm*—Thelen Reid & Priest LLP

(57) ABSTRACT

The present invention concerns an emergency opening control device for an aircraft door to allow the door to be opened more slowly in an initial phase of opening and more rapidly in at least one subsequent opening phase.

6 Claims, 4 Drawing Sheets

CONTROL DEVICE AND METHOD FOR EMERGENCY OPENING OF AN AIRCRAFT EVACUATION DOOR

This application claims priority of French application no. 01 12838 which was filed on Oct. 5, 2001, and was not published in English.

TECHNICAL FIELD

The present invention concerns a control device and method for the emergency opening of an aircraft evacuation door. It also concerns an aircraft emergency evacuation device equipped with such an opening control. Evacuation door is taken to mean an aircraft door intended as an exit door for the occupants of an aircraft in case of an incident or accident. An evacuation door can also be used, under normal use conditions, for embarkation and disembarkation of passengers and/or the crew members of the aircraft.

The invention can be applied to different types of aircraft, including civil or military, and in particular to passenger transport airplanes.

STATE OF PRIOR ART

Aircraft entries/exits are typically delimited by a frame, connected to the fuselage, which receives a door linked to it by a hinge. The hinge defines the door's travel as it is displaced between open and closed positions. The hinge also allows control of the door's orientation whilst it is being displaced.

Entries/exits are also equipped with means for locking the door to the frame. The locking means, designed to ensure the door's closed position, are usually handled manually by the crew or by the airport's ground personnel.

Lastly, the door and the frame are provided with stops which come into contact during closing. Pressurisation inside the aircraft assists in maintaining contact between the stops and support surfaces to which they are coupled.

Aircraft entries/exits can be used as safety exits for an emergency evacuation. For this application they are equipped with evacuation equipment such as inflatable slides, for example. The slides can be stored in compartments built into the fuselage or the aircraft's wing. It is nevertheless more usual to arrange for a compartment for the slides directly in the entry/exit doors able to be used in the event of emergency evacuation.

When the door is closed, following passenger embarkation, the personnel on board arm a system which mechanically connects the slide, stowed in the door, to the door threshold, that is to the fixed frame.

For normal opening of the door, the system mechanically connecting the slide to the door frame is disarmed allowing the door to be opened without deployment of the slide.

On the other hand, in the case where door opening occurs during an emergency evacuation procedure, the slide is automatically deployed outside the aircraft.

Slide deployment takes place, for example, by inflation using a means of inflation designed for this purpose.

Certification authority regulations stipulate that total evacuation of an aircraft must be carried out within 90 seconds, with half the doors and safety exits operational. This time interval commences when an evacuation signal (illuminated panel, sound signal) is emitted, and terminates when all passengers and crew have reached the ground. It thus encompasses the opening of the doors, slide inflation, evacuation of passengers, the crew verifying that all passengers have in fact left the aircraft and crew evacuation. These different stages are all the more difficult to implement in the allotted time, considering the passengers' inevitable hesitation at the top of the slides and the escape route passengers must take to get to the safety exits.

Given the very short time allowed for total evacuation of passengers and crew, it is important to carry out operations not subject to human intervention in a minimum time period, that is, in particular, the opening of the door and the slide inflation. To this effect, in the event of an accident or incident, an emergency door opening device replaces the device used in a normal situation. When personnel on board unlock the door to open it, the emergency opening device automatically applies a very significant force to the door allowing it to be rapidly opened, without human intervention and overcoming the external constraints which might impede its opening. Generally, strong pressure is supplied in a cylinder which, by means of a piston, causes the door to be suddenly opened.

At the same time, the action of unlocking the door initiates the slide deployment and inflation. Typically, the duration of these operations (opening of the door and deployment-inflation of the slide) should not exceed 10 seconds.

Aeronautical manufacturers seek to gain time in these automatic operations of opening of the door and deployment-inflation of the slide. These operations are effectively the only ones it is possible to optimize. An ongoing aim is thus to increase the speed of opening of the door and of deployment/inflation of the slide.

A safety issue however arises when the time taken for opening the door is insufficient to ensure complete deployment of the slide.

Document EP-0 741 073 is cited as an illustration of the technological background. It describes a damping device for opening and closing of an onboard access door. The document only applies, however, to opening and closing of the door under normal conditions of use, that is for embarkation and disembarkation of passengers. The described device stops an unexpected strong pressure exerted on the door (for example a gust of wind) throwing the door against the fuselage (entailing risk of shock and damage to the fuselage or to one of the door's own mechanisms) or a crew member's limb (for example, an arm stuck in the door frame). The device described in the abovementioned document has thus as its sole objective to respond to an untimely external prompting capable of modifying the normal operating conditions of the door.

DISCLOSURE OF THE INVENTION

The present invention aims to propose a command device and method for emergency opening of an aircraft door, as well as an emergency evacuation device which does not have the limitations mentioned above.

One objective is in particular to allow emergency opening of entry/exit doors which is particularly rapid.

Another objective is to avoid complete opening of the door before deployment of an evacuation equipment associated with the entry/exit under consideration.

One objective, finally, is not to delay the opening of the door until complete deployment of the evacuation equipment.

To attain these objectives, the invention has, more precisely, as its object, a control device for emergency opening of an aircraft door comprising:

at least one triggering mechanism for emergency opening, at least one door actuator, and means of power supply to the actuator responding to the triggering mechanism.

According to the invention, the device also comprises means for modification of the power delivered by the means of power supply to the actuator, to allow the door to be opened more slowly in an initial phase of opening and more rapidly in at least one subsequent opening phase. Whilst the description which follows refers to only one triggering mechanism and one actuator, it is understood the device of the invention may comprise several triggering mechanisms, manual or automatic, as well as several actuators. In the case of a number of actuators, these can work in a concomitant, successive or sequential fashion.

Whilst, in each phase, the power delivered to the actuator is sufficient to allow the door to be opened, the power delivered to the actuator is weaker in the initial phase than in the subsequent phase or phases. In the initial phase the power is provided for producing a relatively slow opening.

The slow initial opening of the door, whilst simultaneously triggering the opening of the door and the deployment of the evacuation equipment, permits the full opening of the door to be delayed, thus allowing time for the evacuation equipment's deployment. The slow phase of door opening is termed the initial phase insofar as the door is not completely opened at the end of this phase. This feature prevents an agitated passenger from climbing out of the aircraft before complete deployment of the evacuation equipment.

During the subsequent phase or phases of door opening, a greater power is supplied to the actuator so as to proceed with and rapidly complete the opening of the door.

In one particular embodiment of the control device, it can comprise a time delay sequencer to control delivery of a first power to the actuator during the initial phase and of a second power greater than the first power in the final phase.

The time delay sequencer can be, for example, an electric sequencer. It can also comprise a trigger spring capable of being released by the triggering mechanism and coupled to a shock absorber. The sequencer is connected to the means for modification of the power delivered to the actuator.

In variations not described in detail here, the opening phases can also be controlled by the degree of deployment of the passenger evacuation equipment.

The means of power supply can be, for example, electric, hydraulic or pneumatic. They are then linked to actuators in the form of electric, hydraulic or pneumatic cylinders.

In one advantageous implementation of the invention, described hereafter, the means of power supply are pneumatic and, more precisely, of pressurized gas.

They comprise, for example, a first and second source of pressurized gas, the first source of pressurized gas being at a lower pressure than the second source of pressurized gas. The means for modification of the power delivered to the actuator comprises a distributor to successively connect the actuator to the first then the second source of pressurized gas. The sources of pressurized gas can comprise reservoirs of compressed air or nitrogen.

Supply of the first source of pressurized gas to the actuator corresponds to the initial slow opening phase, whilst supply of the second source of pressurized gas to the actuator, corresponds, for example, to a second phase of rapid and complete opening of the door.

According to an alternative embodiment of the device, the means of power can also comprise a single source of pressurized gas. In this case, the means for modification of the power delivered to the actuator comprise a regulating valve for regulating a gas flow between the source of pressurized gas and the actuator.

The invention also concerns an aircraft emergency evacuation device comprising:

an aircraft evacuation door at least one item of passenger evacuation equipment capable of being deployed close to the door, and a control device for emergency opening of the door, such as described above.

Evacuation equipment is taken to mean all equipment capable of being deployed in an emergency to facilitate the evacuation of passengers and crew. In particular the evacuation equipment can include one or several inflatable slides and/or equipment able to be used as life rafts.

Advantageously, the emergency opening triggering mechanism may be coupled to means of deployment of the passenger evacuation equipment.

Lastly, the invention concerns an automatic emergency opening method for an aircraft door. According to the method, the door receives a first actuation in an initial phase of opening and a second actuation, greater than the first, in a subsequent phase of opening of the door.

Whilst deployment of the evacuation equipment can still be achieved during a phase of opening subsequent to the initial phase, the duration of the initial phase is preferably set so as to be greater than or equal to the duration of deployment of the evacuation equipment. For example, the duration of the initial phase of the door opening and slide deployment may be in the order of 6 seconds and that of a subsequent opening phase may be 4 seconds.

Other characteristics and advantages of the invention will emerge from the following description, in reference to the figures of the accompanying drawings. This description is given purely by way of illustration and is not restrictive.

DETAILED DESCRIPTION OF EMBODIMENTS OF THE INVENTION

In the following description, identical, similar or equivalent parts of the different figures are designated by the same reference numbers to facilitate comparison between figures. On the other hand, and for clarity's sake, not all elements in the figures are shown to the same scale.

Figure 1:
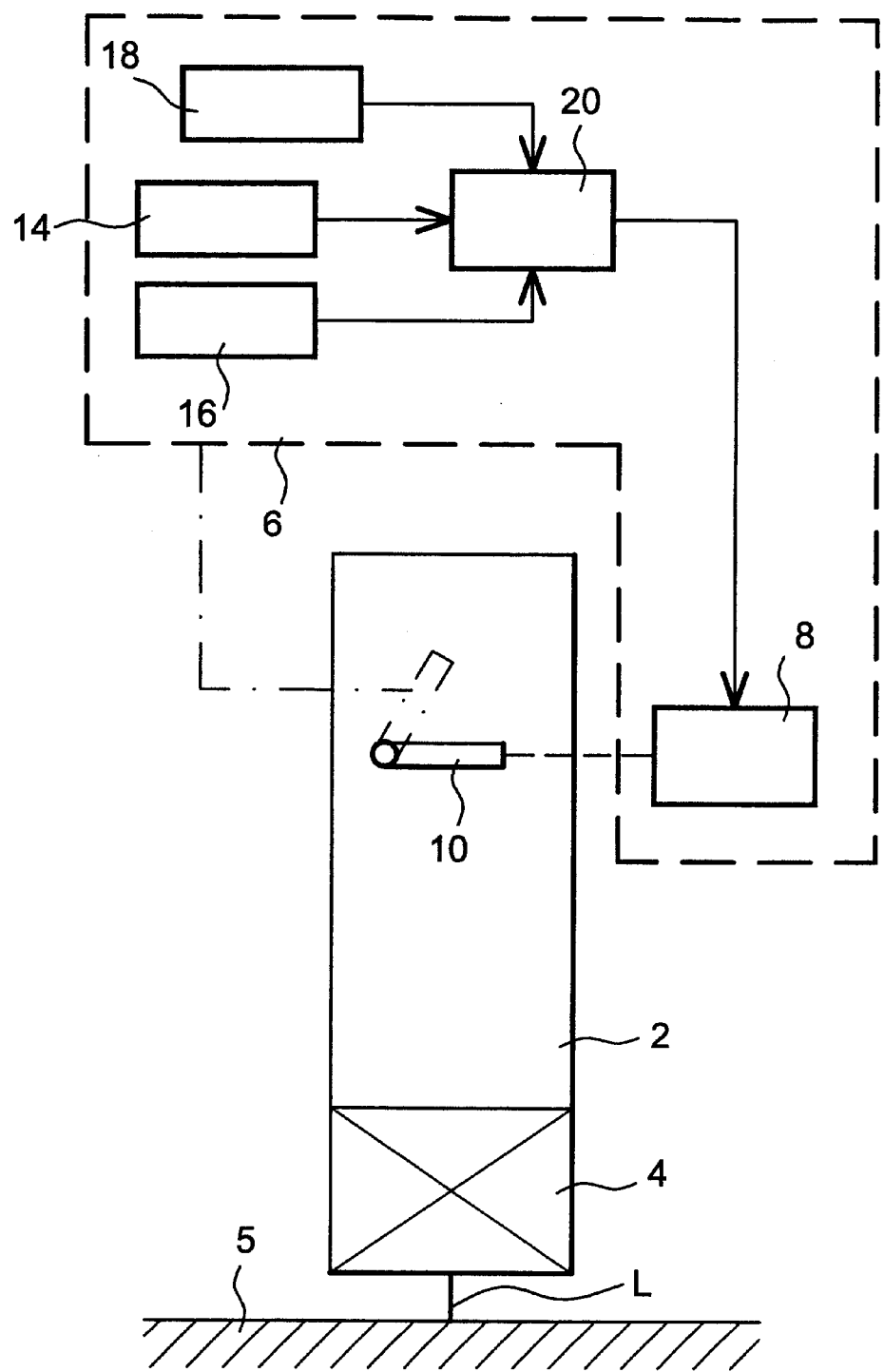
FIG. 1 shows schematically a control device for the opening of an aircraft door, in conformance with the invention, and an evacuation device equipped with it.

FIG. 1 shows an emergency evacuation device comprising a door 2. This is an onboard access door allowing passenger embarkation or disembarkation under normal conditions of use. The doorway, located, for example, close to the aircraft wing, also constitutes a safety exit for emergency evacuation of passengers from the aircraft.

Passenger evacuation equipment, such as a slide 4, is housed at the bottom of the door 2. As shown symbolically in FIG. 1, the slide is attached to the aircraft's fuselage 5 before takeoff. It can in particular be attached to the door threshold. This takes place by arming a link mechanism L, controlled by the cabin personnel. The link mechanism is represented symbolically by a simple line. At the end of the flight, when no emergency evacuation procedure has been carried out, the link mechanism is disarmed and the slide remains in its compartment 4 in the bottom of the door 2.

On the other hand, in the case of an emergency evacuation, the link mechanism linking the slide to the fuselage is not disarmed. The slide thus remains attached to the fuselage, during its deployment.

Reference 10 on FIG. 1 designates a lever forming a triggering mechanism for emergency opening of the door 2. When the lever 10 is operated, a control device for automatic opening of the door 2 is activated. The action of operating the lever 10 also has the effect of triggering deployment of the evacuation equipment, in this case the slide 4.

The emergency door opening device essentially comprises an actuator 8, means of power supply to the actuator, 14, 16, and means 20 for modification of the power delivered to the actuator.

Reference 18 designates a time delay sequencer designed to drive the means 20 for modification of the power delivered.

In the example illustrated in FIG. 1, the means of supply comprise two power supply sources. A first source, 14, for a weaker power supply, and a source, 16, for a stronger power supply. The means for modification, 20, is designed to link the first supply source 14 to the actuator 8 in an initial opening phase, to carry out a slow opening of the door 2. Then, after a time set by the time sequencer 18, the means for modification 20 links the second source 16 to the actuator 8 for rapid opening of the door.

Figure 2:
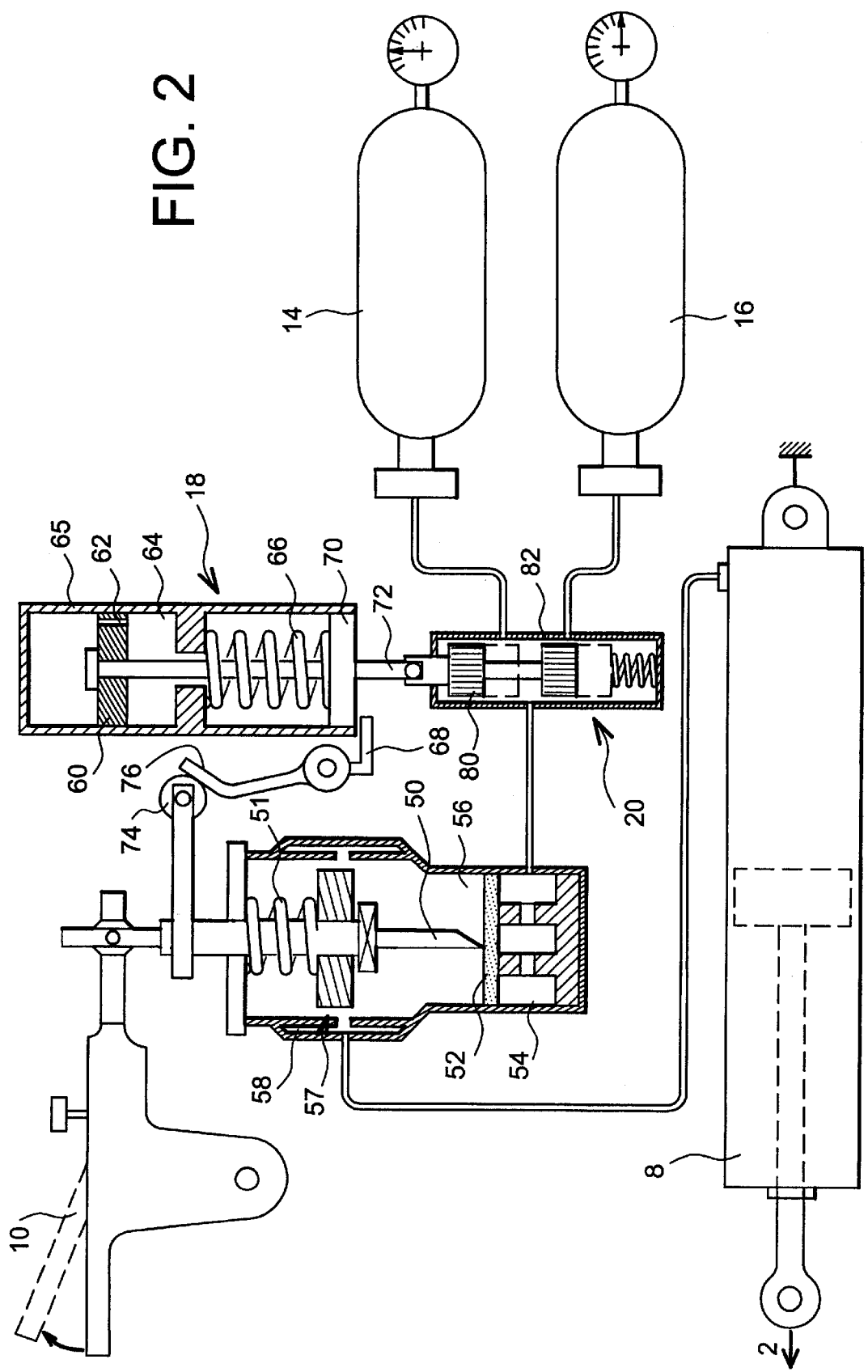
FIG. 2 shows in more detailed fashion a particular embodiment of the control device of FIG. 1.

FIG. 2, described hereafter, illustrates a particular embodiment of the emergency opening device 6 in FIG. 1 in which the opening of the door is pneumatic.

The first and second power supply sources, 14 and 16, are reservoirs of pressurized gas, for example compressed air. By analogy with FIG. 1, the reservoirs are also designated by references 14 and 16. The pressure of the gas contained in the first reservoir 14 is less than that contained in the second reservoir 16.

When the lever, 10, is operated as indicated by an arrow, this causes displacement of a punch 50, loaded by a spring 51. The punch 50 pierces a membrane 52 within a percussion valve. The membrane 52 separates a first chamber 54 of the percussion valve from a second chamber 56.

Whilst this aspect is discussed in the remainder of the description, it can be noted that the first chamber 54 contains pressurized gas which is supplied by the first reservoir 14. This gas spreads into the second chamber 56 as soon as the membrane 52 is ruptured.

The punch's displacement also leads to the opening of a valve 57 which connects the second chamber 56 with a third chamber 58 linked to the door's actuator 8.

The actuator 8 is shown here as a pneumatic cylinder. This cylinder consists of a piston driven by the pressurised gas originating from the first reservoir 14. The pressurized gas supplied to the cylinder crosses the first, second and third chambers of the percussion valve. Fed by the pressurised gas from the first reservoir 14, the cylinder commences the slow opening of the door.

The operation of the lever 10 also causes the triggering of the time sequencer 18. This comprises a piston 60 charged by a spring 66. The piston 60 is equipped with a jet 62 and separates two chambers 64 and 65 of the sequencer. An incompressible fluid contained in chambers 64 and 65 has to pass through the jet 62, from chamber 64 to chamber 65, to allow the piston to move.

At a rest position, shown in FIG. 2, a tappet, 68, resting on a collar 70, attached to the rod 72 of the piston 60, prevents the spring's release. When the lever 10 is operated, a wheel 74 pushes against an arm 76 and displaces the tappet 68. The spring 66 then causes the piston 60 to be displaced. The piston's displacement takes place at a speed dictated essentially by the passage of fluid through the jet 62, that is by the jet's diameter. The jet 62 constitutes, along with the piston and chambers 64 and 65 a damper to the spring's 66 release.

As it moves, the piston, pulls the piston rod 72 which moves a slide valve 80.

The slide valve 80 forms part of the means 20 for modification of the power delivered to the door actuator. The slide valve 80 moves within a distributor 82, from an initial position open to the first reservoir of compressed gas 14 to a position open to the second reservoir of compressed gas 16.

More precisely, the slide valve 80 with an initial position allowing passage of gas from the first reservoir 14 and blocking off passage of gas from the second reservoir 16, moves to a position in which it frees passage of gas from the second reservoir and blocks off passage of gas from the first reservoir.

After the slide valve has moved, a second door opening phase is implemented. The gas under strong pressure from the second reservoir crosses the percussion valve and is applied to the cylinder 8. Rapid opening of the door ensues.

Preferably, the time delay, that is in particular the diameter of the jet 62, is adjusted so as to allow sufficient deployment of the slide between the instant when the lever 10 is applied and the instant when the second pressurized gas reservoir 16 is linked to the cylinder.

Figure 3:
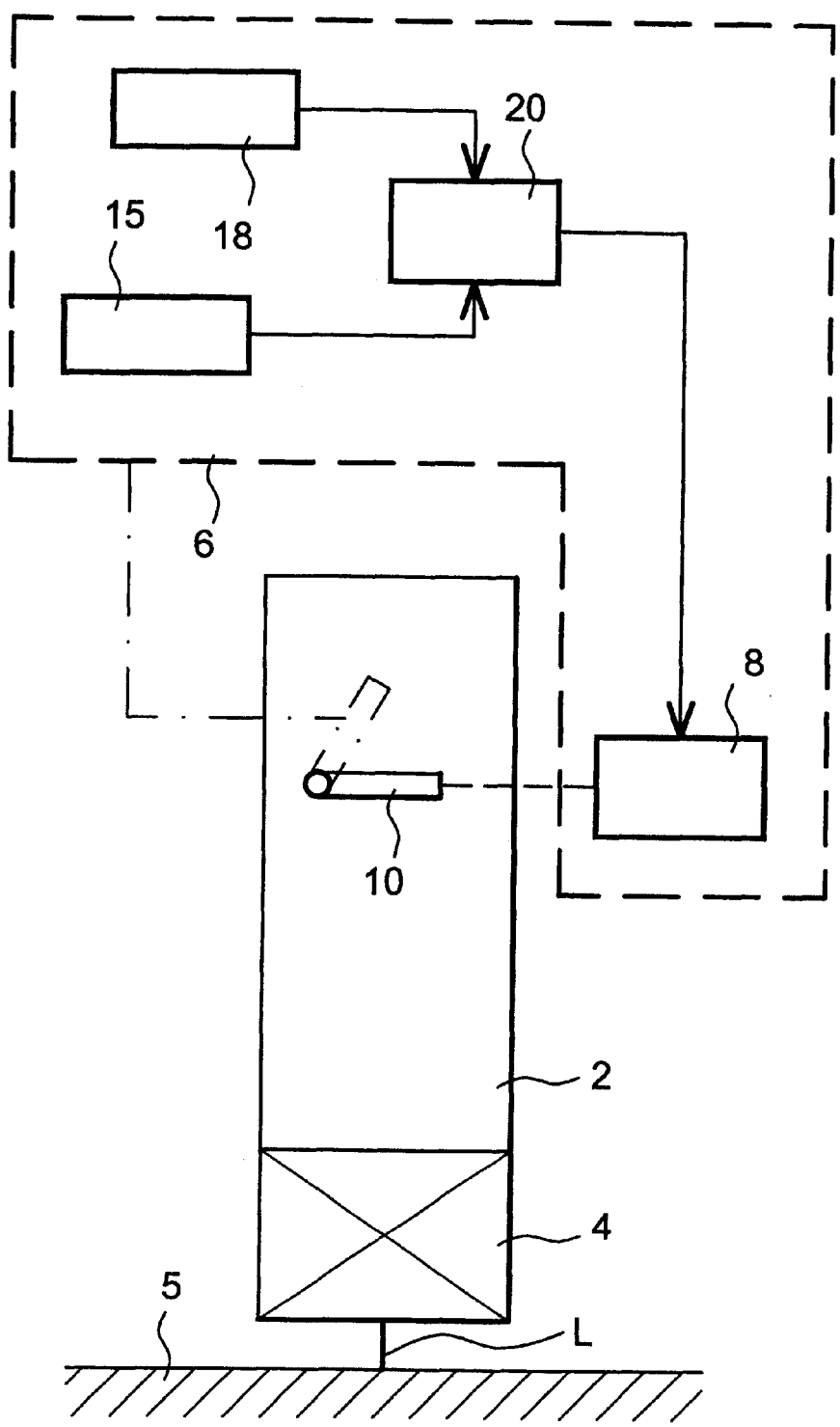
FIG. 3 shows schematically another control device for the opening of an aircraft door, also in conformance with the invention, and an evacuation device equipped with it.

Another possible embodiment of the evacuation device according to the invention is illustrated in FIG. 3.

FIG. 3 shows a large number of parts which are identical to those in FIG. 1. The description of these parts is thus omitted.

In contrast to FIG. 1, the emergency opening device 6 in FIG. 3 has only one power supply source. This is indicated by reference 15.

The means 20 for modification of the power delivered to the actuator 8 is no longer a means which allows the simple commutation between two sources but a means allowing adjustment of the power supplied by the single source 15. The adjustment between different values can be gradual, thus corresponding to different phases of the door opening. The adjustment can also be continuous between a nil and maximum value.

In the latter case, the initial phase and the subsequent phase or phases do not correspond to stages of constant power output but to ranges of change in power delivered to the actuator.

The time sequencer 18 serves, in this example, to control the speed of change of the pressure supplied to the actuator.

This speed is adjusted preferably so that the opening of the door is relatively slow during deployment of the slide and more rapid after its deployment.

Figure 4:
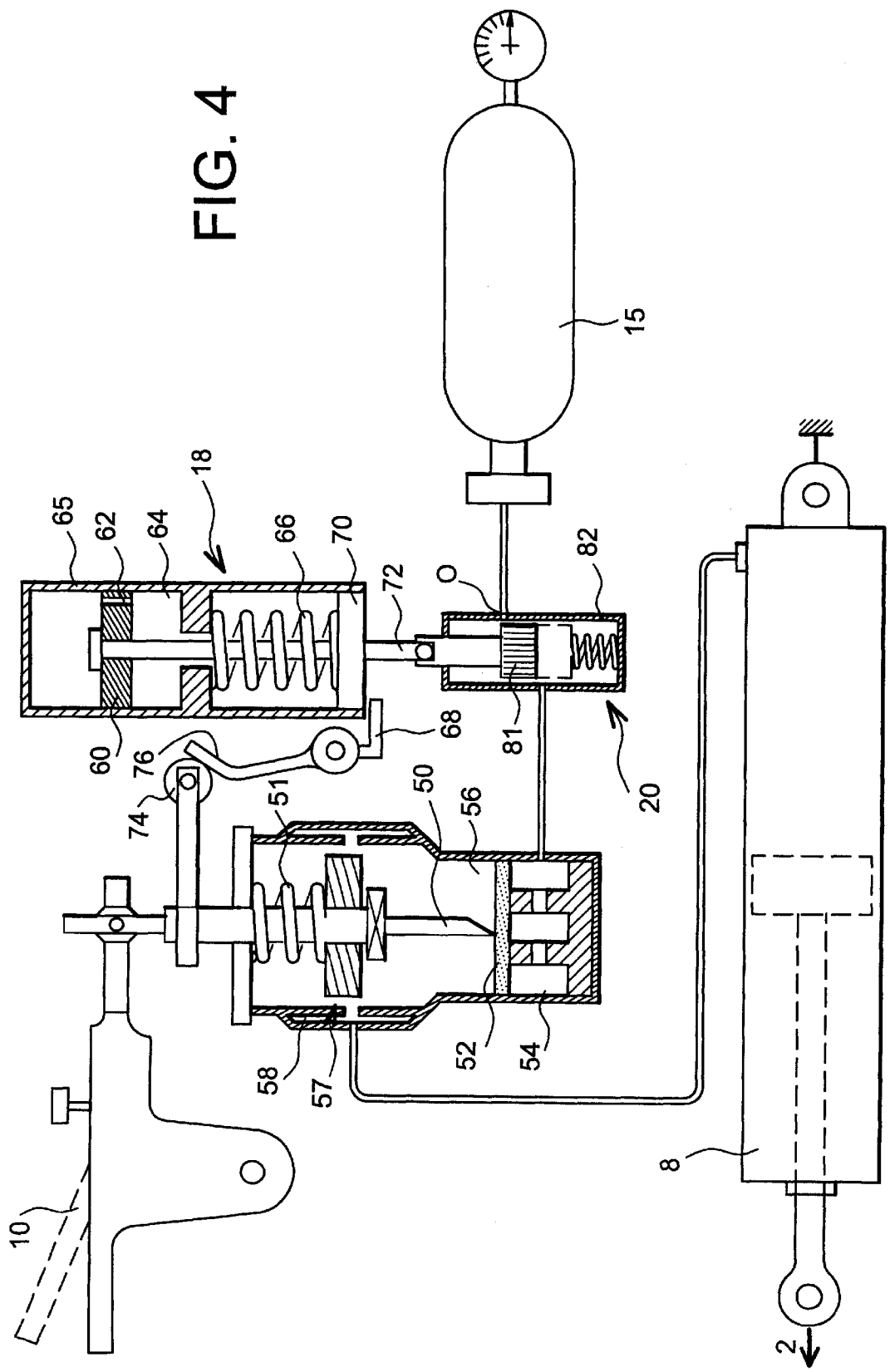
FIG. 4 shows in more detailed fashion a particular embodiment of the control device of FIG. 3.

FIG. 4 shows a particular embodiment of an aspect of the device in FIG. 3, in which the opening of the door is pneumatic.

The figure comprises a large number of the elements already mentioned in relation to FIG. 2. For these elements, indicated by the same references, one can refer to the preceding description.

One can see, in FIG. 4, that the opening device contains only one reservoir 15 of pressurized gas. This reservoir replaces the two reservoirs 14 and 16 in FIG. 2. However, the pressure of the gas contained in the reservoir 15 is greater than the pressure of the gas contained in the first reservoir 14 of the device in FIG. 2. In other words, the pressure is sufficient to allow rapid opening of the door. The pressure in the single reservoir 15 in FIG. 4 is preferably greater than or equal to the pressure in the second reservoir 16 in FIG. 2.

During the initial phase of opening of the door, a plug 81 of a regulating valve 82, comparable to the distributor in FIG. 2, has a position in which it partially blocks a passage outlet O for the gas from the reservoir 15 towards the chambers 54, 56, 58 and towards the cylinder 8. In this position, and when the membrane 52 is perforated, the gas under relatively weak pressure is led towards the cylinder for slow opening of the door. In fact, the gas pressure falls via throttling brought about by the partial blocking of the gas's passage.

Then, under the action of the time sequencer 18, the plug 81 is pushed into a second position in which the passage of gas is entirely liberated an in which gas under strong pressure is applied to the cylinder 8. This corresponds to a second phase of rapid opening of the door.

The translation between the initial phase when the passage of gas is partially blocked to the phase where it is entirely free can be abrupt or gradual. The gradual transition can be obtained by the displacement of the sequencer 18's piston rod 72 and/or by the shape of a gas passage allowed in regulating valve 82 and/or by the shape of the plug 81. For an abrupt transition from the position of the throttled gas passage in the regulating valve 82 to the clear passage position, the piston rod displacement is simply used to regulate the time taken between the moment of initial release and the moment where the clear gas passage position is attained.

What is claimed is:

1. A control device for emergency opening of an aircraft door comprising:
   at least one triggering mechanism (10) for emergency opening,
   at least one door actuator (8),
   means (14, 15, 16) of power supply to the actuator (8) responding to the triggering mechanism, and
   means (18, 80, 81, 82) for modification of the power delivered by the means of power supply to the actuator (8), to control a slower opening of the door in an initial phase of opening and more rapid opening in at least one subsequent opening phase,
   wherein the means of power supply are pneumatic means comprising a first and second sources of pressurized gas, the first source of pressurized gas (14) being at a lower pressure than the second source of pressurized gas (16), and the means for modification of the power delivered to the actuator comprising a distributor (82) to successively link the actuator to the first then the second source of pressurized gas.

2. A control device for emergency opening of an aircraft door comprising:
   at least one triggering mechanism (10) for emergency opening,
   at least one door actuator (8),
   means (14, 15, 16) of power supply to the actuator (8) responding to the triggering mechanism, and
   means (18, 80, 81, 82) for modification of the power delivered by the means of power supply to the actuator (8), to control a slower opening of the door in an initial phase of opening and more rapid opening in at least one subsequent opening phase,
   wherein the means of power are pneumatic means comprising a single source (15) of pressurized gas, in that the means for modification of the power delivered to the actuator comprises a regulating valve (82) for regulating a gas flow between the source of pressurized gas and the actuator,
   wherein said regulating valve (82) comprises a passage outlet (O) for the pressurized gas and a plug (81) capable of partially blocking or entirely liberating the passage outlet.

3. A control device for emergency opening of an aircraft door comprising:
   at least one triggering mechanism (10) for emergency opening,
   at least one door actuator (8),
   means (14, 15, 16) of power supply to the actuator (8) responding to the triggering mechanism, and
   means (18, 80, 81, 82) for modification of the power delivered by the means of power supply to the actuator (8), to control a slower opening of the door in an initial phase of opening and more rapid opening in at least one subsequent opening phase,
   wherein the means for modification of the power delivered to the actuator comprise a time delay sequencer (18) for delivering a first power to the actuator during the initial phase and a second power greater than the first power in the subsequent phase,
   wherein the time delay sequencer comprises a trigger spring (66) capable of being released by the triggering mechanism (10) and linked to the means for modification of the power delivered to the actuator, the trigger spring being coupled to a shock absorber (60, 62, 64, 65).

4. Aircraft emergency evacuation device comprising:
   an aircraft exit door (2),
   at least one item of passenger evacuation equipment (4) capable of being deployed close to the door, and
   a control device for emergency opening of the door,
   such that the emergency opening control device conforms to any of the preceding claims.

5. The evacuation device according to claim 4, further comprising means of deployment of the passenger evacuation equipment, said means of deployment being activated when said emergency opening triggering mechanism (10) is activated.

6. The evacuation device according to claim 5, wherein the evacuation equipment is stowed in the doors, said door being delimited by a frame, and said evacuation equipment is capable of being connected to said frame.

* * * * *